United States Patent [19]

Shibata et al.

[11] Patent Number: 4,698,190

[45] Date of Patent: Oct. 6, 1987

[54] METHOD AND APPARATUS OF CONTROLLING GRANULATION OF MOISTURE-ABSORBING POWDER MATERIAL

[75] Inventors: Takeo Shibata; Kazumasa Nagasawa, both of Shizuoka, Japan

[73] Assignee: Kabushiki Kaisha Okawaraseisakusho, Shizuoka, Japan

[21] Appl. No.: 851,447

[22] Filed: Apr. 14, 1986

[30] Foreign Application Priority Data

Sep. 2, 1985 [JP] Japan ............................ 60-193435
Sep. 12, 1985 [JP] Japan ............................ 60-202248
Oct. 21, 1985 [JP] Japan ............................ 60-233450

[51] Int. Cl.$^4$ ..................... B29B 9/08; B29C 67/02
[52] U.S. Cl. ................................ 264/40.2; 250/339; 264/40.1; 264/117; 425/135; 425/145; 425/222
[58] Field of Search ............... 264/40.1, 40.3, 40.6, 264/40.7, 117, 40.2; 23/313 FB, 313 R; 73/73; 364/476; 250/339, 340; 425/145, 222, 147, 135

[56] References Cited

U.S. PATENT DOCUMENTS

| | | | |
|---|---|---|---|
| 3,636,148 | 1/1972 | Slagel | 264/40.7 |
| 3,856,441 | 12/1974 | Suzukawa et al. | 425/7 |
| 3,880,968 | 4/1975 | Kaspar et al. | 264/37 |
| 3,931,377 | 1/1976 | Dollinger et al. | 264/40.1 |
| 4,251,475 | 2/1981 | Varrasso et al. | 264/40.1 |
| 4,466,076 | 8/1984 | Rosenthal | 364/498 |
| 4,499,111 | 2/1985 | Oetiker et al. | 426/231 |
| 4,535,620 | 8/1985 | Cunningham | 73/23.1 |

FOREIGN PATENT DOCUMENTS 982771 12/1982 U.S.S.R. ............................ 364/476

Primary Examiner—Jan H. Silbaugh
Assistant Examiner—MaryLynn Fertig
Attorney, Agent, or Firm—Fleit, Jacobson, Cohn & Price

[57] ABSTRACT

A control method for a granulating apparatus of the type in which a binder liquid is added to powder material having high moisture absorbing properties while fluidizing the powder material thereby producing granules or granular material of a desired particle size. In this control method, the moisture content of powder material to be granulated is continuously detected with a high degree of accuracy by a moisture content detector and in accordance with the detected value the rotation speed of a binder feed pump or the like is adjusted through a moisture content regulator thus varying for example the rate of addition of the binder and thereby controlling the moisture content of the powder material.

2 Claims, 4 Drawing Figures

METHOD AND APPARATUS OF CONTROLLING GRANULATION OF MOISTURE-ABSORBING POWDER MATERIAL

BACKGROUND OF THE INVENTION

The present invention relates to a method of controlling a granulating apparatus of the type which produces granules or granular material of a desired particle size by adding a binder liquid to powder material which is high in moisture absorption characteristics while fluidizing the powder material.

In the case of known fluidized bed granulating apparatus of the type in which starting powder material is fluidized in a stream of hot air and, while adding a binder liquid to the fluidized powder material, the particles of powder are adhered and agglomerated thus producing granules, the moisture content of the powder material capable of maintaining the proper fluid state has a given range depending on the properties of the powder material so that if the moisture exceeds the upper limit, the flowing movement is rapidly slowed down and lumps are produced. If the moisture content increases further, the flowing movement is stopped so that the powder material solidifies to agglomerate form and the granulating apparatus is rendered inoperable.

With this type of conventional granulating apparatus, it has been the usual practice to use a control method of for example detecting the temperature or humidity of the exhaust air and thereby controlling the temperature of the hot air or the feed rate of the binder. Also, in the case of the batch-type apparatus, it has been usual to use a method of setting a feed time of the binder by a timer while controlling the temperature and flow rate of the hot air constant. On the other hand, with the granulating operation of moisture-absorbing powder material, the required range of moisture contents for maintaining the proper flowing movement has been extremely small so that as for example, the upper limit is about 3% D.B. in the case of amino acid-containing flavoring material and about 5% D.B. in the case of powder soy and exceeding such upper limit of the moisture content has the effect of rapidly deteriorating the fluid state and stopping the flowing movement in a very short period of time.

With these conventional methods of the granulating apparatus, however, it has been impossible to detect such a small change as a change in the exhaust air temperature or humidity and it has been impossible to maintain constant the amount of hot air supply due to for example the clogging of the bag filter incorporated in the apparatus proper in the case of the batch process. Thus, it has been necessary to operate the apparatus with a considerably low moisture content in order to avoid the danger of stopping the flowing movement of the powder material within the apparatus and agglomerating the powder material due to the operations of the apparatus, such as, the repetition of the addition of the binder liquid and the intermediate drying.

Thus, the conventional methods have been disadvantageous in that since it is impossible to detect an increase in the moisture content which would deteriorate the flowing movement thus making it necessary to always monitor the fluid state by visual inspection and also the apparatus must be operated with a relatively low moisture content with the resulting decrease in the growth rate of particles, thus requiring a longer granulating time and also making it difficult to increase the product yield with respect to the desired particle size.

SUMMARY OF THE INVENTION

The present invention has been made to overcome the foregoing deficiencies in the prior art and it is an object of this invention to provide a method of controlling the granulation of moisture-absorbing powder material which not only prevents the occurrence of any deterioration in the flowing movement of the powder material during the operation and produces granules of a stable particle size through a continuous operation but also reduces the granulation time and increases the product yield.

In accordance with one aspect of the invention, when fluidizing powder material to be granulated contained in a fluidization chamber by the use of forced air, agitator or the like, adding a binder to the powder material and agglomerating and granulating the powder material to granules or granular material of a desired particle size, the moisture content of the fluidized powder material to be granulated is detected continously by moisture content detecting means mounted in a proper place within the fluidization chamber so that in accordance with the thus detected value the growth rate of particles closely related to the moisture content is controlled in such a manner that the granulation is effected efficiently in a short period of time. In the case, in accordance with a specific example of the control, the growth rate of particles is controlled by adjusting the speed of a binder feed pump or the opening of a regulating valve through a moisture content regulator in accordance with the moisture content of the fluidized powder detected by the moisture content detecting means and thereby varying the feed rate of the binder from a binder spray nozzle. Also, in accordance with another example, additionally the temperature of hot air supplied to the fluidization chamber is adjusted by temperature regulating means.

The moisture content detecting means may for example be a moisture meter of the infrared absorption type which is arranged in the proper place within the fluidization chamber and in this way the moisture content of the powder material within the fluidization chamber is detected in a non-contact manner. In this case, more preferably a suitable amount of air is supplied into the detecting tube of the infrared absorption-type moisture meter through a blast pipe connected to the detecting tube thereby preventing the powder material within the fluidization chamber from being blown up into the detecting tube.

In accordance with the invention, the moisture content of the fluidized powder material is continuously maintained at the proper value and thus there is no danger of causing any lumps in the powder material in process or stopping the flowing movement of the powder material to cause consolidation of the powder material. Also, a control of the growth time of particles for ensuring a uniform particle size or a control of the rate of increase in the moisture content of powder material during its granulation operation and a control of the moisture content at the end of the granulation operation for obtaining the desired average particle size are performed accurately.

In accordance with the invention, by virtue of the fact that the moisture content of fluidized powder material to be granulated is detected with a high degree of accuracy so that in accordance with the detected value the moisture content of the powder material being granulated is maintained at the proper value and the rate of increase in the moisture content is controlled as desired, there is an effect that it is possible to stably produce product of the desired particle size by a continuous automatic operation thus not only reducing the required granulation time but also improving the product yield.

The above and other objects as well as advantageous features of the invention will become more clear from the following description taken in conjunction with the drawings.

DESCRIPTION OF THE PREFERRED EMBODIMENTS

Figure 1:
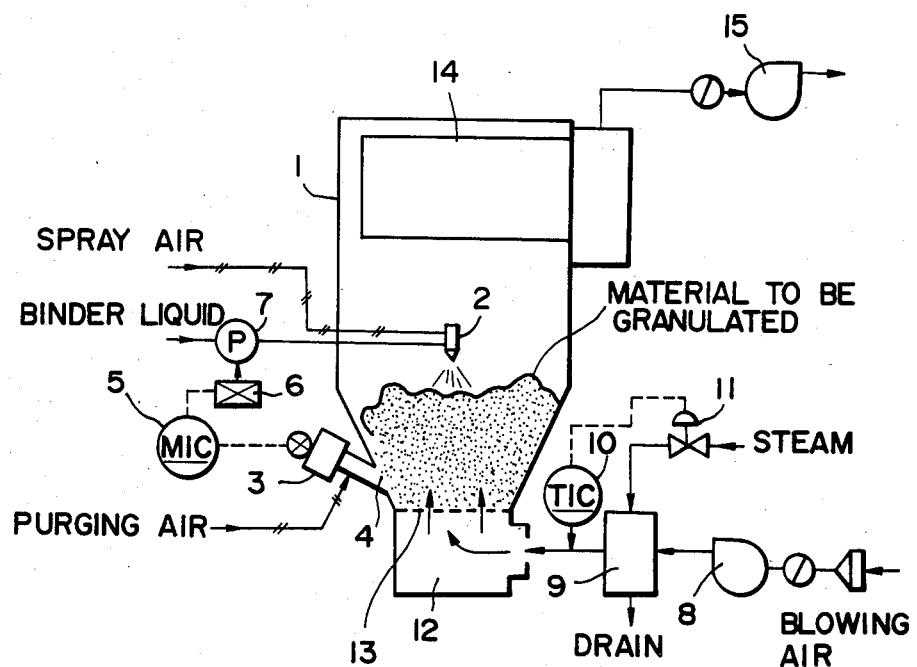
FIG. 1 is a schematic diagram showing the overall construction of an apparatus for performing a granulation control method according to an embodiment of the present invention.

Referring to FIG. 1 illustrating a schematic diagram showing the overall construction of an apparatus for granulating moisture-absorbing powder material, numeral 1 designates a granulating apparatus proper for containing and processing powder material, 2 a binder liquid spray nozzle, and 3 an infrared absorption-type moisture meter for detecting continuously and in a non-contact manner the moisture content of powder material being fluidized and subjected to a granulation process within the granulating apparatus proper 1 through a detecting tube 4. Numeral 5 designates a moisture content regulator operable in response to the detection output signal of the infrared absorption-type moisture meter 3, 6 means for setting a speed determined by an adjustment output of the moisture content regulator 5, and 7 a binder feed pump operable in response to the speed setting of the speed setting means 6 to vary the amount of binder liquid supplied to the binder liquid spray nozzle 2. Numeral 8 designates a blowing fan for drawing in and supplying external air to a heat exchanger 9, 10 a temperature regulator for detecting the output temperature of the heat exchanger 9 whereby in accordance with an output signal corresponding to the difference between the output temperature and a preset value a regulating valve 11 is operated and the amount of steam supplied to the heat exchanger 9 is controlled, 12 a hot air chamber for supplying the hot air from the heat exchanger 9 into the granulating apparatus proper 1 through the opening formed in the lower part thereof, 13 a gas dispersing plate formed with a large number of holes therethrough and separating the hot air chamber 12 and the fluidized powder material, 14 a bag filter for collecting the fine powder scattered from the granulating apparatus proper 1 and brush them again down into the fluidized bed, and 15 an exhaust fan for discharging the air cleaned by the bag filter 14 to the outside.

Figure 2:
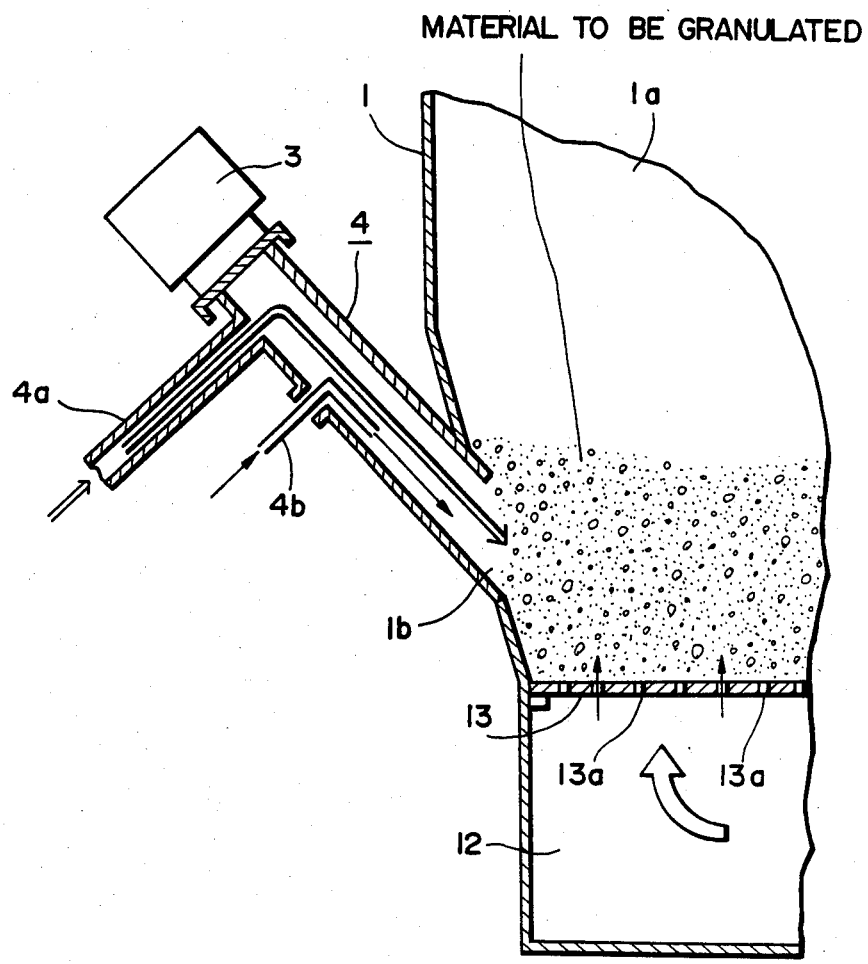
FIG. 2 shows in detail the principal part of the moisture content detecting means shown in FIG. 1.

FIG. 2 is a sectional view showing in detail the infrared absorption-type moisture meter 3 and the tube 4 and the portion of the granulating apparatus proper 1 where the former are fitted. In the Figure, numeral 4a designates a main purge pipe, and 4b a by-path purge pipe. The purging air is supplied through these pipes from a source of air which is not shown.

With the above-constructed granulation control apparatus for performing the method of this invention, as shown in FIG. 2, the hot air adjusted to the desired temperature by the temperature regulator 10 is forced into a fluidization chamber 1a of the granulating apparatus proper 1 from the hot air chamber 12 through a large number of holes 13a formed through the gas dispersing plate 13 and the powder material to be granulated within the fluidization chamber 1a is maintained in a fluid state. On the other hand, the purging air supplied from the main purging tube 4a the provided on the detecting tube 4 is passed through the detecting tube 4 and blown into the fluidized powder material present in the vicinity of the opening of the granulating apparatus proper 1. Thus, the powder material is prevented from entering into the detecting tube 4 and the powder material is moved practically along the opening. On the other hand, the perging air supplied from the by-pass purging tube 4b removes the powder material tending to deposit on the bottom of the detecting tube 4.

As a result, the powder material apparently remains in a stationary state in relation to the infrared absorption-type moisture meter 3 and it satisfies the requirements for a measuring surface used for measuring the amount of attenuation of the infrared rays projected to and reflected by the material to be measured after the absorption of the light energy by the material in proportion to its moisture content.

Under these stable measuring conditions, the moisture content of the powder material detected by the infrared absorption-type moisture meter 3 is converted to a given signal and applied to the moisture content regulator 5 thereby operating the speed setting means 6 in accordance with the deviation between the detected moisture content and a desired preset value corresponding to the type of the powder material. Then, an amount of binder liquid corresponding to the flow rate or the rotation speed of the binder feed pump 7 determined by the output of the speed setting means 6, is mixed with spraying air, atomized and sprayed from the binder liquid spray nozzle 2 thus inducing flowing movement of the powder material within the desired ranges of temperatures and moisture contents and thereby granulating the powder material.

By using the above-described granulation control apparatus according to the invention, experiments on the fluidized bed granulation of moisture-absorbing powder material such as powder soy or amino acid-containing seasoning have been conducted and the results of the experiments have shown: (1) The growth rate of particles is determined only by the moisture content of the powder material irrespective of the amount of the solid matter contained in the added binder liquid. (2) The amount of the solid matter in the added binder liquid has an effect on the strength of particles and the percentage of the particulate material made into powder during the finishing and drying operations is increased with a decrease in the amount of the solid matter. (3) As a result, if, for example, the finished and dried particles are screened by a 100-mesh sieve and the yield of the plus sieve particles is compared with the conventional one, for the same amount of the added binder solid matter, the product yield will be increased if the granulation is performed by increasing the moisture content of the powder material. The correlation between the above-mentioned granulating conditions and results has been grasped.

In other words, it has been found that by suitably determining the moisture content of powder material at the end of the addition of a binder or the rate of increase in the moisture content during the addition of a binder, it is possible to control the particle size of product as desired and hence it is possible to improve the yield of product of the desired particle size.

Figure 3:
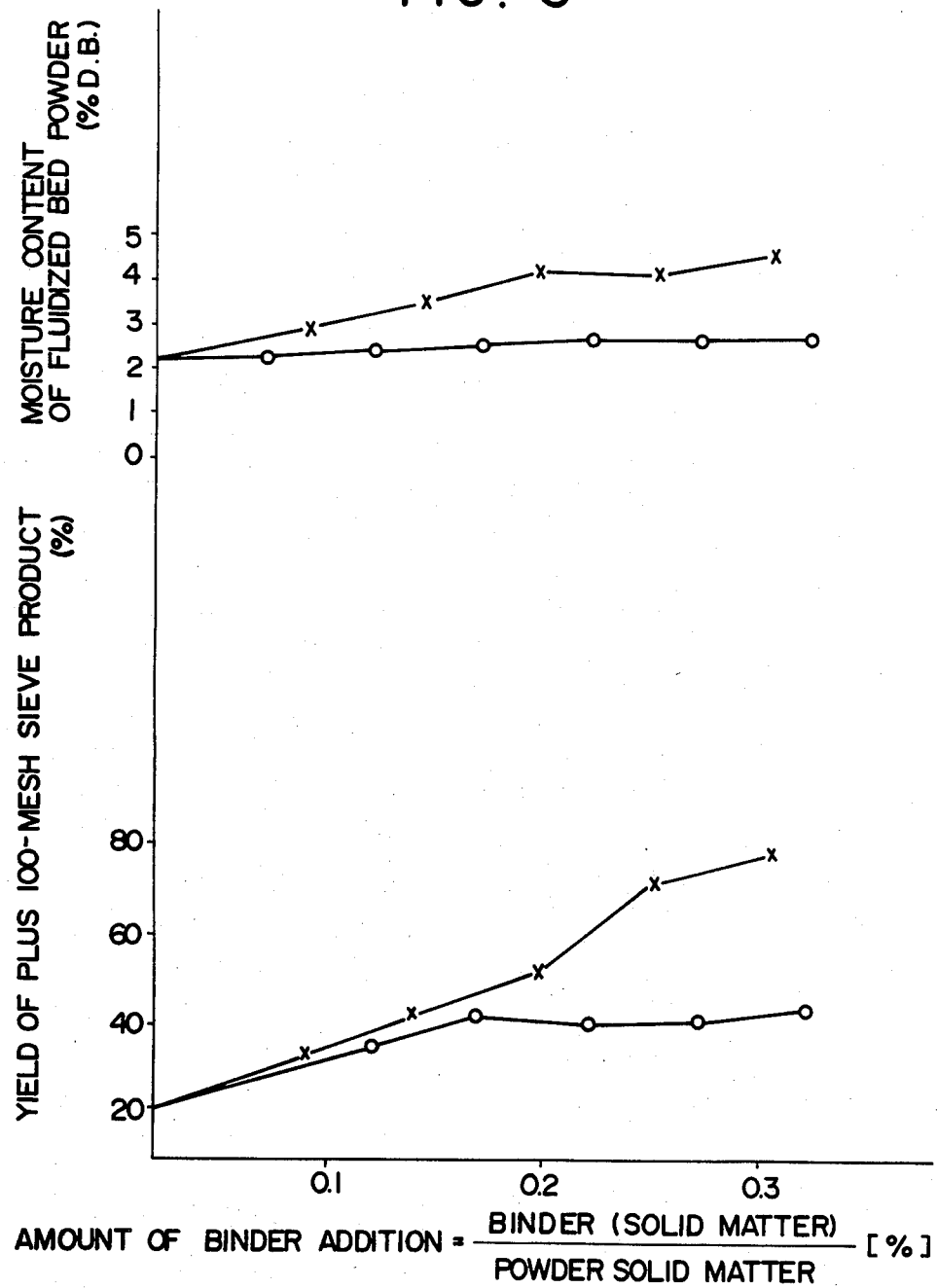
FIGS. 3 and 4 are graphs showing the results of the experiments conducted according to the invention.
Figure 4:
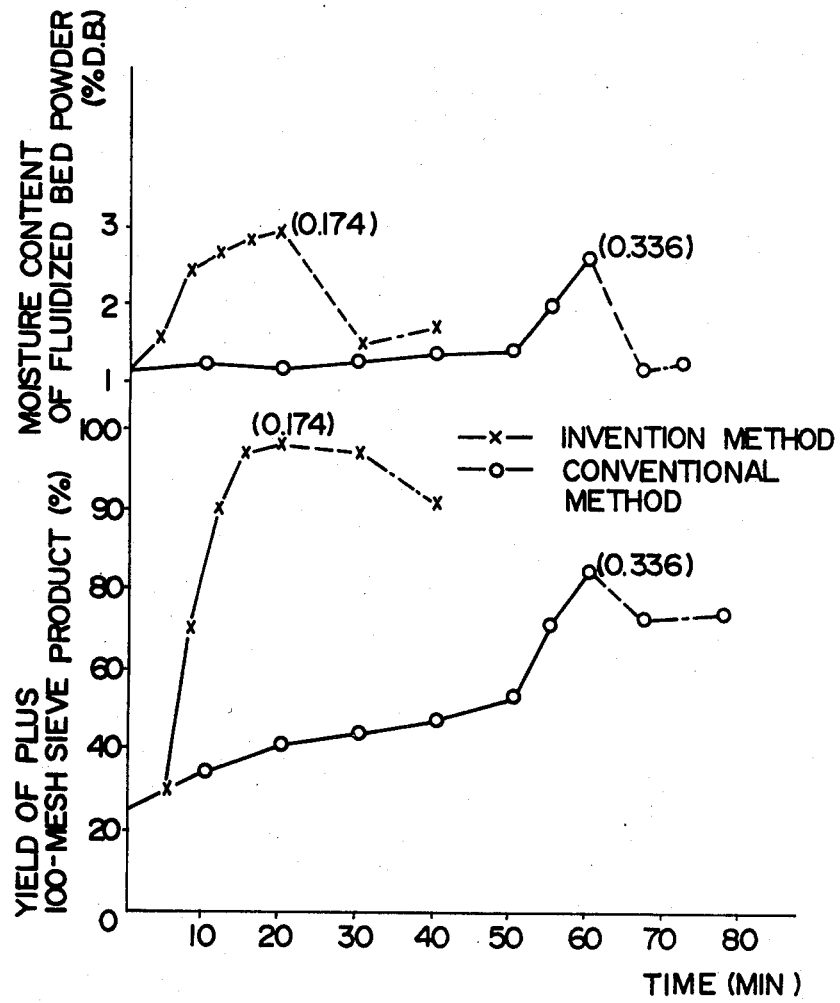

FIGS. 3 and 4 are graphs showing the results of the experiments conducted in accordance with the above-mentioned embodiment used with a batch-type granulating apparatus. More specifically, the graph of FIG. 3 shows the results of the exemplary granulation operations of powder soy, that is, the results of a comparison between the yields of plus 100-mesh sieve products of powder material obtained by adding the same amount of a binder liquid and varying only the operating moisture content. It has been found that there is a definite correlation between the moisture content and the yield of plus 100-mesh sieve product and that the yield can be increased by 35% by increasing the moisture content at the end of the operation by 2% D.B.

The graph of FIG. 4 shows the results of the exemplary granulation operations of amino acid-containing seasonings produced by the conventional method and the method of the invention, that is, the granulated particles and moisture contents as well as the yields of plus 100-mesh sieve product are shown with the abscissa representing the operating time. It has been found that by setting the moisture content at the end of the operation to 28% D.B. which is just prior to causing an insufficient fluidization, it is possible to reduce the operating time and the addition of binder liquid to about one half and increase the yield by 18% than previously.

The operating conditions in the experiments were as follows:

Apparatus used: batch-type fluidized bed granulating apparatus (agitator incorporating type)
Fluidized bed area: 0.2 m²
Hot air temperature: 80° C.
Fluidizing air velocity: 0.82 m/sec
Binder: 20% potato starch
Binder liquid velocity: (The conventional method)
  1. 5-minute spraying at 70 g/min and 1-minute in-process drying for 0–48 minutes (cycle spraying)
  2. 110 g/min for 48–60 minutes (continuous spraying)
(The invention method)
  1. Maximum binder feed rate, 110 g/min
  2. Moisture content regulator setting, 28% D.B.

While, in the above-described embodiment, the material to be granulated is fluidized by blowing the hot air into the granulating apparatus proper 1 through the gas dispersing plate 13 arranged in the lower part of the apparatus proper 1, the same effect can be obtained by fluidizing the material by the use of a mechanical agitator or the like incorporated in the granulating apparatus proper 1.

We claim:

1. An apparatus for performing a method for controlling granulation of moisture absorbing power material wherein the fluidized powder material to be granulated is contained in a fluidization chamber by forced air or agitation, a binder is added to said material and said materials are formed into granules by agglomerating and particle forming, said apparatus comprising:
   a fluidization chamber for containing said powder material;
   a binder liquid spray means for spraying a binder liquid supplied by a binder feed pump to said fluidization chamber;
   a detecting tube connected at the lower portion of one wall of said fluidization chamber;
   an infrared absorption-type moisture meter for directly and continuously detecting the moisture content of said powder material within said fluidization chamber in a non-contact manner, said infrared absorption-type moisture meter being connected to the opposite end of said detecting tube as said fluidization chamber;
   a main purging tube means for blowing a main purging air supplied from an external air source into the fluidized powder material through the detecting tube so that the powder material does not enter the detecting tube, said main purging tube being connected to said detecting tube nearest the end connected to said infrared absorption-type moisture meter; and
   a second purging tube means for blowing a sub-purging air from the external air source into the lower portion of the inner surface of said detecting tube to remove powder material which is deposited on the bottom of said detecting tube, said sub-purging tube means being connected to said detecting tube at about the middle portion of said detecting tube.

2. In a method for controlling granulation of moisture absorbing powder material wherein the fluidizing powder material to be granulated is contained in a fluidization chamber by forced air or agitation, a binder is added to said material and said materials are formed into granules by agglomerating and particle forming;
   the improvement wherein said method further comprises detecting the moisture content of said powder material within said fluidization chamber in a non-contact manner by an infrared absorption-type moisture meter, connecting said infrared absorption-type moisture meter to said fluidization chamber by a detecting tube, connecting to said detecting tube a main purging tube at said detecting tube near the end closest to said infrared absorption-type moisture meter and connecting an external air source to said main purging tube, activating said external air source to provide air to said detecting tube so that the powder material is prevented from entering said detecting tube, connecting a sub-purge tube to said detecting tube at the middle portion of said detecting tube, connecting said sub-purge tube to said external air source, and activating said external air source so that powder material which is deposited on the lower portion of the inner surface of said detecting tube is removed.

* * * * *